United States Patent Office 3,468,248
Patented Sept. 23, 1969

3,468,248
APPARATUS FOR REMOVING INK FROM THE SURFACE OF WIPING CYLINDERS USED IN DIRECT STEEL PLATE PRINTING
Gualtiero Giori, 4 Rue de la Paix, Lausanne, Switzerland
Continuation-in-part of applications Ser. No. 411,807, Nov. 17, 1964, and Ser. No. 504,492, Oct. 24, 1965. This application Feb. 27, 1967, Ser. No. 618,746
Claims priority, application Switzerland, Feb. 23, 1967, 1,644/67
Int. Cl. B41f 35/04; B41l 41/04
U.S. Cl. 101—167        3 Claims

ABSTRACT OF THE DISCLOSURE

Apparatus for removing ink from the surface of wiping cylinders used in direct steel plate printing which puts the cylinder in contact with an aqueous cleaning solution, with at least one brush in contact with the region of the wiping cylinder wet by the solution, with a first resilient scraping blade for removing the film of cleaning solution adhering to the cylinder, with a water jet for rinsing off the cleaning solution from the surface of the cylinder, with a second scraper blade for removing the rinse water, with a felt member for removing possible traces of ink pigments from the cylinder. Aqueous cleaning solution for use with the apparatus.

---

Figure 1:
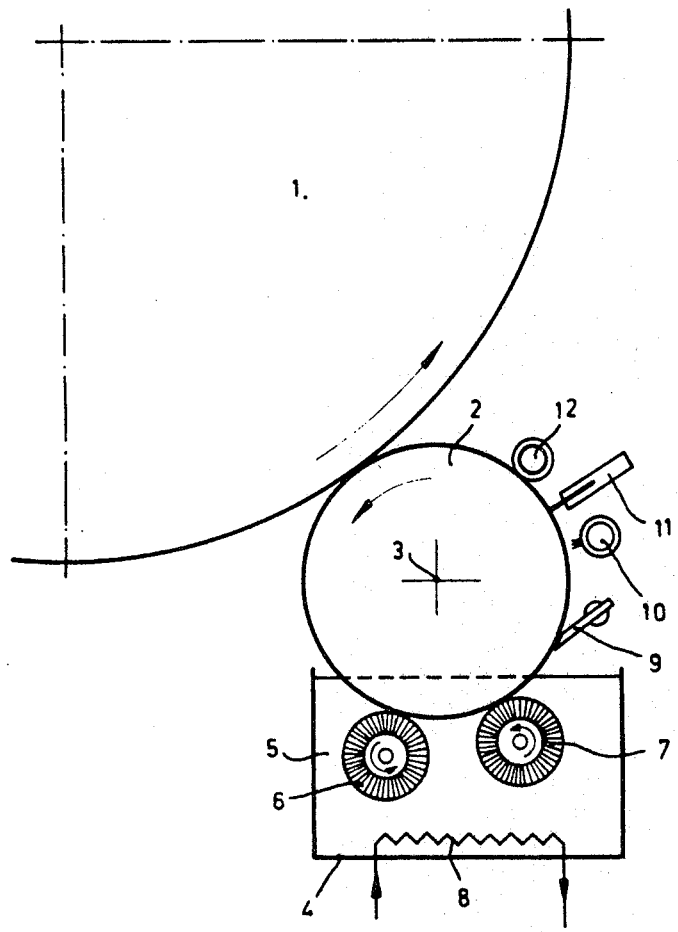

This application is a continuation-in-part of my previous applications Serial No. 504,492, filed October 24, 1965, now Patent No. 3,389,656; and Serial No. 411,807, filed November 17, 1964, now abandoned.

This invention relates to apparatus for use in conjunction with aqueous solutions disclosed and claimed in said co-pending application No. 504,492, for efficiently cleaning ink from wiping cylinders for steel plate printing machinery. As used herein the term "steel plate printing" while falling under the definition of "Intaglio" must be distinguished from the term Heliogravure which also falls under the term of intaglio. This is because the type of ink is entirely different in the two types of printing. The apparatus herein is designed to effectively remove the thick, pasty ink employed in direct or steel plate printing.

Heretofore those skilled in the art were convinced that only solvents such as trichloroethylene could ensure the complete and speedy dissolution of the thick, pasty inks used in direct or steel plate printing from the plates and engraved cylinders. This prior art removal was based on a purely physical solution phenomena without any chemical action on the constituents of the inks and these could be found unchanged by evaporating the cleaning solutions. Solvents of the trichloroethylene type were disadvantageous: because they were expensive and required the installation of costly recovery equipment, because their vapor required ventilation of the plants and finally because the cleaning solution had to be replaced at least twice a day while the printing machine shut down for the time necessary to replace the cleaning solution.

Modern inks used for steel plate printing consist essentially of a three-component system. The first component consists of a varnish in a vegetal oil base, with salts of resinous acids such as calcium resinates, in particular calcium abietate, and wood oil or linseed oil. The second component is a pigment of a desired color and the third is a filler, usually calcium carbonate.

As stated above, these inks are very viscous to the point of being pasty and it was thought by those skilled in the art that their removal from a wiping cylinder working synchronously with a printing plate and rotating at about 60–100 rotations per minute could only be effected by rapid, purely physical dissolution by an organic solvent like trichloroethylene. The reason for this was that chemical processes were thought to be much too slow.

However in applicant's above-mentioned applications, it was shown that an aqueous solvent comprising a solution containing from about 1 to about 5 percent (preferably 1 to 2.5) by weight of a strong base, such as KOH and NaOH, from about 2 to 10 percent (preferably 2 to 5) by weight of a detergent such as $Na_3PO_4$, and from about 0.3 to 10 percent (preferably 1 to 3%) by weight of a wetting agent such as sulfated or sulfonated castor oil or linseed oil truly was effective in removing ink from the engraved surfaces of single or multicolour steel printing plates.

There was also disclosed in said application an apparatus for employing this new solvent and the present application provides improvements therein.

Figure 2:
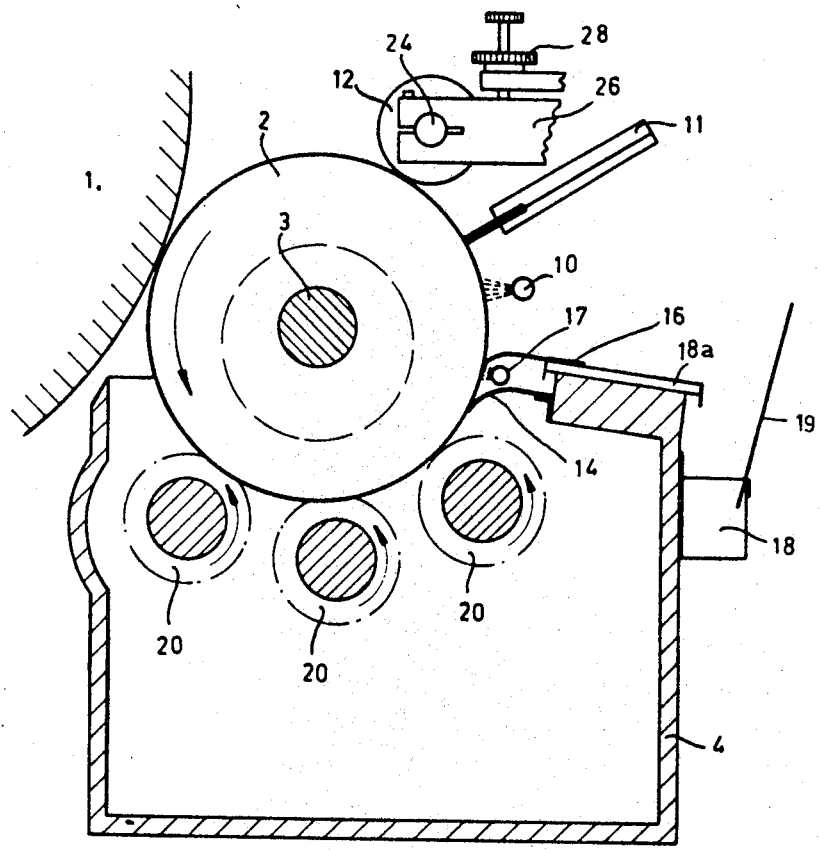

In the drawing:
FIGURE 1 is a front elevational view partly in section of the apparatus of the invention;
FIGURE 2 is the same for a modification thereof.

Referring to FIGURE 1, 1 denotes generally a stereo cylinder 1 (only partially shown) carrying the printing plates (not shown) belonging to an intaglio steel plate printing machine and inked in conventional manner with inks of one or more color by ink rollers cooperating with the wiping cylinder 2 rotatable about an axle 3 and having a smooth surface. As indicated by the arrows, the wiping cylinder 2 and stereo cylinder 1 rotate in the same direction so that in their mutually contacting zone their peripheral movement is oppositely directed in order to obtain optimum wiping by sliding friction. Naturally cylinder 1 can also be an engraved cylinder.

If a wiping device is used which operates with two wiping cylinders, wiping cylinder 2 may be taken to be any one of such cylinders. When it is used as a preliminary wiping cylinder, the cylinder 2 would rotate in the reverse direction so that it could roll off at the same peripheral speed and direction as the stereo cylinder without any sliding frictions.

The wiping cylinder 2 plunges with the lower part of its surface into a tank 4 filled with an aqueous solution 5 of a composition to be disclosed in more detail hereinafter. Inside the tank 4 are arranged two rotating brushes 6 and 7 which preferably rotate in the same direction as wiping cylinder 2 so that in their mutually contacting zone they have an opposite peripheral speed as the wiping cylinder and rotate at a much higher speed than the wiping cylinder.

The functions of the constituents of the above cleaning solvent are the following. The wetting agent causes the ink constituents to form an emulsion which rapidly disperses in water. The detergent stabilizes the emulsion against its tendency to coagulate the dispersed particles and forms compounds with the fatty substances of the ink as well as soluble alkaline salts of the resinates. The base serves to saponify components of the vegetal oil and also to form water soluble alkaline salts. There remains after treatment of the ink, a clear solution with a precipitate of insoluble (usually calcium phosphate) anionic salts, thus evidencing a true chemical process. This conclusion is reinforced by the fact that addition of acid to the solution will cause the reappearance of the emulsion.

The cleaning solution preferably is heated to a temperature between 30 and 80° C., preferably 50° C., and kept there by means of a heating device 8 of the well known type, which on the drawing is shown in the form of a heating coil. These operating conditions clearly constitute a desiderata that is by no means critical since under certain conditions it may be desirable to operate with cold water in order to compensate for the heat generated by friction between the wiping cylinder and the rollers, this friction rapidly bringing the temperature of even a very cold solution up to about 30° C.

The rotary brushes 6 and 7 preferably have a peripheral speed of five to ten times that of the wiping cylinder.

After the cleaning solution has been removed from the surface of the wiping cylinder a scraper blade 9 is positioned so as to press against the surface of the wiping cylinder and preferably made of rubber ensures that the film of cleaning liquid adhering to the surface of the wiping cylinder is mechanically scraped off.

In order to remove any residue of cleaning solution from the surface of the wiping cylinder, the embodiment shown in the drawings provides, behind scraper blade 9, a spring nozzle system 10 by means of which cold or hot water is sprayed onto the surface of the wiping cylinder. After this spraying nozzle system, there is positioned another scraper blade 11 preferably also of rubber, which scrapes off the adhering film of water sprayed by system 10 from the surface of the wiping cylinder. Finally behind scraper blade 11 is positioned a wiper member or cylinder extending over the entire width of the wiping cylinder parallel with its axis which is covered with felt or similar material and pressed at predetermined presure against the surface of the wiping cylinder. The presence of this element 12 is very necessary for obtaining best results in accord with the inventive principles herein and serves to ensure the removal of possible traces of ink pigments still adhering to the outer surface of the cylinder.

FIGURE 2 shows a modified version of the invention. There is seen therein essentially the same elements as shown in FIGURE 1. However this modification provides for a spray of clean solution to issue from spray nozzle 17 positioned intermediate curved plastic scrapers 14 and 16 secured to a support member mounted on top of tank 4. As shown these scrapers are downwardly curved in order to adhere for as long as possible to the periphery of cylinder 2. In this modification, three rotary brushes 20 are provided inside the tank.

To prevent pure water from diluting the solution in vat 4 the upper surface of scraper 16 is tightly pressed against 2 and the water falls off its inclined upper surface and that of inclined plate 18a to flow into catch bucket 18 toward which it is also guided by baffle plate 19. Drain means (not shown) can be provided for draining spent solution from the vat.

As in the previous figure 10 designates a nozzle for spraying cleaning water on the surface of the cylinder and 11 is a rubber scrapper for removing rinse water. Here the felt wiping member characterizing the invention is more elaborate and consists of a stationary felt disc 12 which is mounted on support 26 on an axle 24 therein and which has a screw 28 for making it rotatable as needed to compensate for wear thereof by friction against cylinder 2 and to expose a clean surface area of cylinder 12 by turning the same by a certain angle. It is thus unnecessary to stop the machine to ensure continuous cleaning action. Also provided are pressure means 28 for ensuring that support 26, and hence cylinder 12, bear against cylinder 2.

In practical experiments demonstrating the successful practice of the invention, a steel plate printing system was set into operation with the cleaning system shown on FIGURE 2. The vat was filled with a solution consisting of the following: 2% potassium hydroxide, 6% $Na_3PO_4 12H_2O$ (or 3% if not in the hydrated form), 1.5% of sulfated castor oil. Cylinder 2 had a top contact layer constituted by polyvinyl chloride (PVC) of the usual Brinnell hardness for taking off ink from the surface of cylinder 1. The vat was filled at constant level by continuously feding the solution above indicated at about 60 to 80 liters per hour through nozzle 17. Good wiping quality was noted as evidenced by the absence of even very small smudges on the printed sheets issuing from the steel plate printing system, this observation denoting that even very small particles of pigments, which heretofore were sometimes found to make small unsightly smudges on the printed material, had successfully been removed.

While the above description has only mentioned the use of one felt member in conjunction with the present apparatus, it is of course obvious that where the quality of the ink requires it several such members may be employed. Similarly, additional scraper means and/or sprays of clean water may be provided.

Furthermore, certain ink compositions and under certain operating conditions it can be helpful to position another scraper blade in contact with the wiping cylinder before the cylinder comes in contact with the cleaning solution which scraper blade has for function to remove the major part of the ink and to prevent the solution from dirtying too rapidly.

What is claimed is:

1. Wiping apparatus for printing machines for steel plate, single or multicolor printing, in which at least one wiping cylinder touches the ink-containing printing plate or engraved cylinders thereof and uses an aqueous solution in a vat for cleaning the wiping cylinder, comprising in sequence at least one brush member in contact with a portion of the said wiping cylinder wet by said solution; a pair of resilient scraping blades in contact with said wiping cylinder; solution projecting means intermediate said blades for projecting fresh cleaning solution against said cylinder; at least one water projecting means for projecting water on said cylinder for rinsing said cleaning solution therefrom; at least one additional scraper blade in contact with the surface of said wiping cylinder for removing rinse water thereof and at least one felt member in contact with the surface of said wiping cylinder for removing traces of ink pigment still adhering thereto, said member consisting of a normally stationary disc mounted for limited movement in contact with said cylinder in order to compensate for wear thereof.

2. Wiping apparatus according to claim 1, wherein said pair of resilient scraping blades is downwardly curved toward said cylinder in order to adhere as long as possible to the periphery thereof.

3. Wiping apparatus according to claim 1, wherein said pair of blades is mounted on a support, said support being secured to the top of said vat, said support comprising a plate downwardly inclined toward a side of said vat, said side having a catch bucket fixed thereto; one of said blades being mounted on said plate tightly against said wiping cylinder to cause water falling off the periphery of said cylinder to flow over said blade, said plate and into said catch bucket thereby avoiding dilution of solution contained in said vat.

References Cited

UNITED STATES PATENTS

| 1,082,586 | 12/1913 | Georges et al. | 101—167 |
| 2,746,387 | 5/1956 | Neumann | 101—155 |

FOREIGN PATENTS

| 548,280 | 4/1932 | Germany. |
| 306,488 | 2/1929 | Great Britain. |

ROBERT E. PULFREY, Primary Examiner

S. D. CROWDER, Assistant Examiner

U.S. Cl. X.R.

134—94; 101—425; 15—4